United States Patent [19]

Makishima

[11] Patent Number: 4,572,456
[45] Date of Patent: Feb. 25, 1986

[54] AUTOMATIC LOCKING TYPE TAKE-UP APPARATUS

[75] Inventor: Yoshihiro Makishima, Yokohama, Japan

[73] Assignee: NSK-Warner K.K., Tokyo, Japan

[21] Appl. No.: 657,483

[22] Filed: Oct. 3, 1984

[30] Foreign Application Priority Data

Oct. 6, 1983 [JP] Japan .......................... 58-154334[U]

[51] Int. Cl.⁴ ...................... A62B 35/00; B65H 75/48
[52] U.S. Cl. ........................................... 242/107.4 D
[58] Field of Search ................. 242/107.4 D, 107.4 A; 280/807, 803; 297/476

[56] References Cited

U.S. PATENT DOCUMENTS 3,667,698 1/1972 Fisher .......................... 242/107.4 D
3,945,586 3/1976 Higbee et al. ............... 242/107.4 D
4,498,643 2/1985 Ono .............................. 242/107.4 D Primary Examiner—John M. Jillions
Attorney, Agent, or Firm—Shapiro and Shapiro

[57] ABSTRACT

An automatic take-up apparatus is used with the seat belt device of a vehicle and can cause a lock member to be engaged with a latch plate rotatable with a webbing take-up shaft to thereby automatically lock the draw-out of webbing. The lock member has its operation controlled by a control member mounted radially outwardly of the latch plate and brought into resilient contact with the latch plate, and is kept in a non-locking position during the draw-out of the webbing and is permitted to move to a locking position when some rewinding of the webbing has been sensed, thereby automatically blocking the draw-out of the webbing after mounted.

3 Claims, 12 Drawing Figures

AUTOMATIC LOCKING TYPE TAKE-UP APPARATUS

BACKGROUND OF THE INVENTION

1. Field of the Invention

This invention relates to improvements in ALR, i.e., an automatic locking type take-up apparatus in the seat belt of a vehicle.

2. Description of the Prior Art

Some of automatic locking type take-up apparatuses are such that for example, when the seat occupant causes a tang and a buckle coupled to webbing to be engaged with each other after he has taken his seat, any further draw-out of the webbing is automatically impossible. To block the draw-out of the webbing, a pawl member may be engaged with a latch plate rotatable with a take-up spool on which the webbing is taken up. To operate the pawl member, it is usually practiced to bring a disc or the like into frictional contact with a friction plate rotatable with the take-up spool and utilize the movement of this disc.

Heretofore, however, the friction plate and the disc have been juxtaposed on the same shaft and the disc has been designed to be resiliently pressed against the friction plate by a spring, and this has led to a disadvantage that the widthwise dimension of the belt take-up apparatus is increased to make the entire apparatus bulky.

SUMMARY OF THE INVENTION

It is an object of the present invention to provide an automatic locking type take-up apparatus of which the widthwise dimension is decreased to make the entire apparatus compact.

It is another object of the present invention to achieve the above object substantially without changing the configuration and structure of the conventional belt-take-up apparatus.

To achieve the above object, in the present invention, the dead space around the latch plate is utilized. That is, the latch plate is considerably smaller than the side plate of the base supporting the take-up spool and there is useless space around it and therefore, a pivotable member resiliently contacted by the latch plate and operatively connected to the pawl member is disposed in this space.

DESCRIPTION OF THE PREFERRED EMBODIMENTS

Some embodiments of the present invention will hereinafter be described with reference to the drawings.

Figure 1:
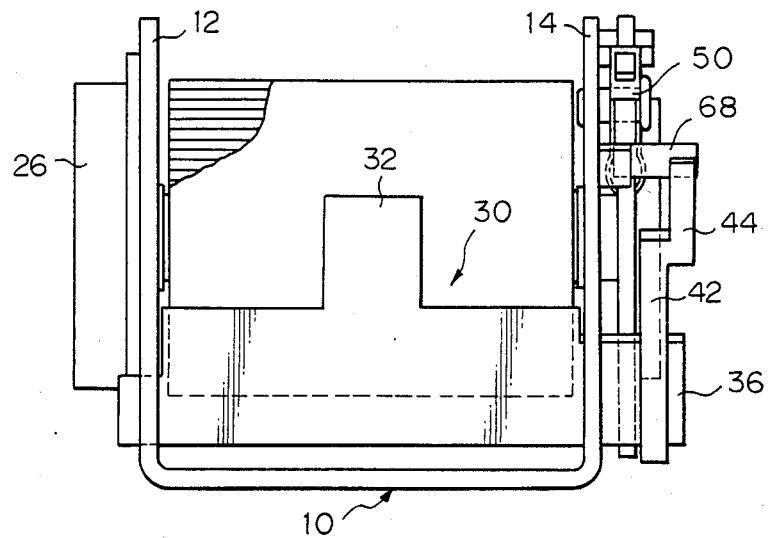
FIGS. 1 to 7 show a first embodiment of the present invention, in which FIG. 1 being a front view, FIG. 2 being a side view, FIG. 3 being a persepctive view of a lever 40, FIG. 4 being a perspective view of a leaf spring 50, FIG. 5 being a perspective view of a stopper 60, and FIGS. 6 and 7 being side views for illustrating the operation.
Figure 2:
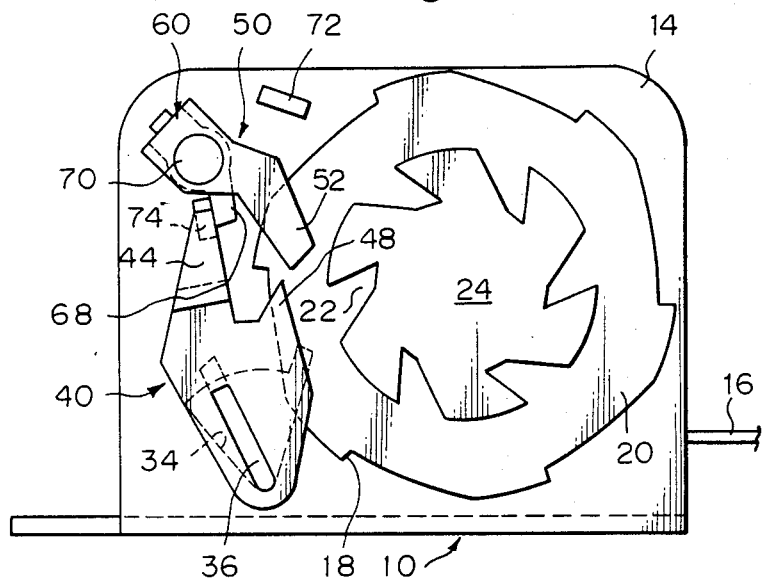

As shown in FIGS. 1 and 2, a take-up spool (not shown) is rotatably supported between the opposite side plates 12 and 14 of a base 10 having a U-shaped cross-section, and webbing 16 is taken up on the take-up spool. Outwardly of one side plate 14, a latch plate 20 having portions 18 provided at intervals in the peripheral edge thereof and a gear 24 of synthetic resin having engaging holes 22 of gradually decreasing width provided at intervals in the peripheral edge thereof are mounted on the take-up spool. Also, outwardly of the other side plate 12, a take-up spring (not shown) for biasing the take-up spool in one direction is disposed and covered by a cover 26. A take-up radius sensing member 30 for sensing the take-up radius of the webbing 16 is mounted on one corner of said one side plate 14. This take-up radius sensing member 30 has at its intermediate portion a tongue-like portion 32 which contacts the winding layer of the webbing 16, and its opposite end portions extend through sector holes 34 (only one of which is shown) formed in the side plates 12 and 14. One end portion 36 (particularly the root portion) provides a pawl (lock means) engaged with the latch portion 18 of the latch plate 20.

Figure 3:
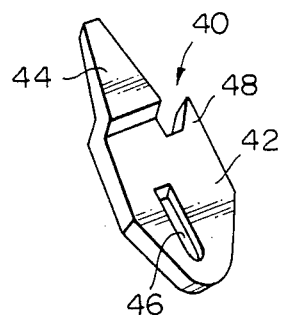

A lever 40 is mounted on the fore end portion of the pawl 36. This lever 40, as shown in FIG. 3, comprises a first planar portion 42 and a second planar portion 44 parallel to each other. The first planar portion 42 is formed with a hole 46 permitting the pawl 36 to fit therein and a pawl portion 48 engaged with the engaging hole 22 of the gear 24, while the second planar portion 44 provides a protrusion engaged with a stopper which will later be described. The lever 40 is biased clockwise by a spring, not shown.

Figure 4:
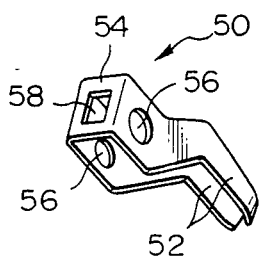
Figure 5:
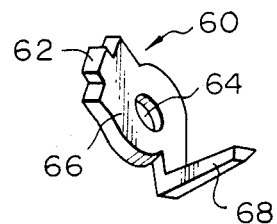

A V-shaped plate spring 50 and a stopper 60 constituting control means are mounted on another corner of the side plate 14 for pivotal movement about a shaft 70. More particularly, the plate spring 50, as shown in FIG. 4, comprises a pair of parallel planar portions 52 bent at the intermediate portions thereof and a connecting portion 54 for connecting these planar portions. Each of the planar portions 52 is formed with a circular hole 56 permitting the shaft 70 to fit therein, while the connecting portion 54 is formed with a rectangular hole 58 permitting the projection 62 of the stopper 60 to fit therein. The stopper 60 is formed of synthetic resin and, as shown in FIG. 5, it is provided with a body portion 66 having a circular hole 64 in which the shaft 70 is fitted and a projection 62, and a protrusion 68 protruding sideways from the body portion. On the opposite sides of the plate spring 50 and stopper 60, stoppers 72 and 74 are formed by cutting up the side plate 14.

Operation of the present embodiment will now be described.

FIG. 2 shows the initial drawn-out state of the webbing 16. As the webbing 16 is drawn out, the latch plate 20 turns counterclockwise, and the leaf spring 50 holding the peripheral edge of the latch plate 20 between it and the planar portion 52 and the stopper 60 integral with the plate spring 50 turn clockwise about the shaft 70. When the stopper 60 turns clockwise, the lever 40 turns counterclockwise through the contact between the protrusion 68 of the stopper 60 and the planar portion 44 (the lever 40 turns clockwise until the protrusion 68 of the stopper 60 bears against the stopper 74), the pawl portion 48 and the pawl 36 are disposed so that the pawl portion 48 does not come into engagement with the gear 24 and the pawl 36 does not come into engagement with the latch plate 20. Accordingly, the webbing 16 can be freely drawn out. The pawl 36 is also adapted to be operated by the take-up radius sending member 30 and, unless the leaf spring 50 and stopper 60 act thereon, the webbing 16 will be drawn out and as the take-up radius decreases, the lever 40, i.e., the pawl 36, turns clockwise. However, by the action of the leaf spring 50 and stopper 60, the pawl 36 is maintained in the state shown in FIG. 2.

Figure 6:
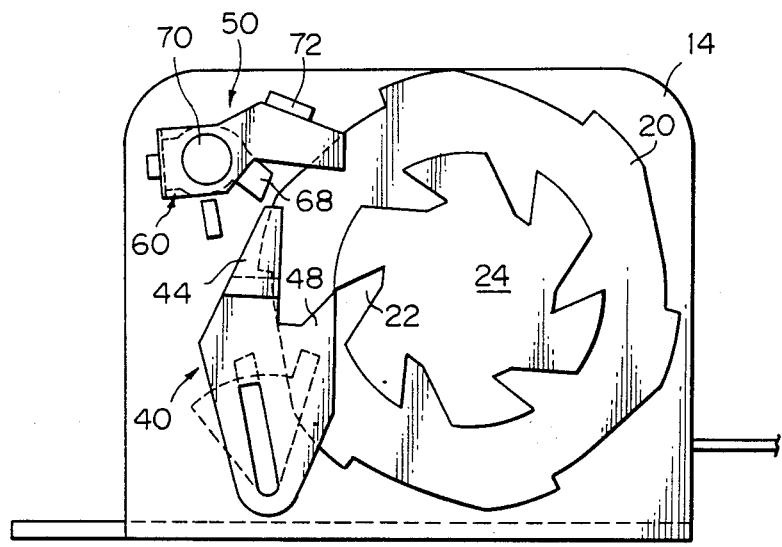

When a buckle and a tang (neither of which is shown) are coupled together after the webbing 16 has been drawn out by a predetermined length, the latch plate 20 and gear 24 are turned clockwise by the action of the take-up spring because the webbing 16 has been drawn out somewhat excessively for coupling, and along therewith, the leaf spring 50 turns counterclockwise about the shaft 70 as shown in FIG. 6 and bears against the stopper 72, whereby it is stopped from turning. When the leaf spring 50 turns counterclockwise, the stopper 60 also turns counterclockwise therewith and the engagement between the protrusion 68 thereof and the protrusion 44 of the lever 40 is released and therefore, the lever 40 is turned clockwise by the action of a spring, not shown. When the phases of the pawl portion 48 of the lever 40 and the engaging hole 22 of the gear 24 become coincident with each other, the pawl portion 48 comes into shallow (slight) engagement with the entrance portion of the engaging hole 22.

Figure 7:
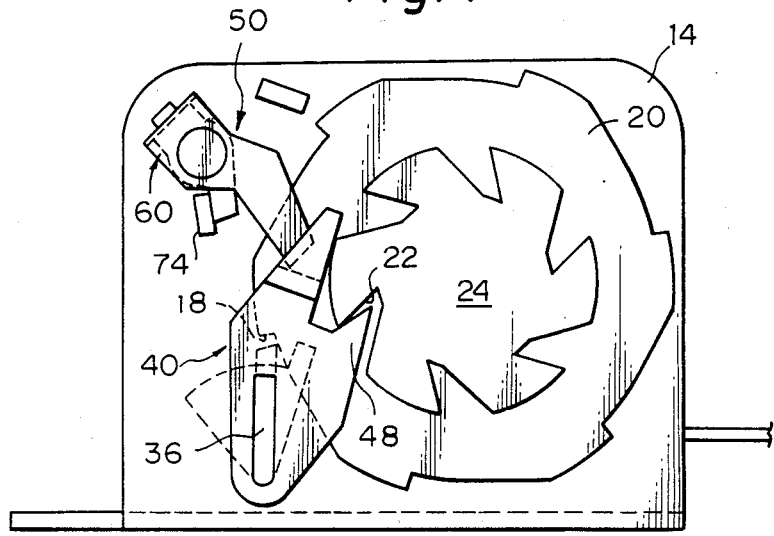
Figure 8:
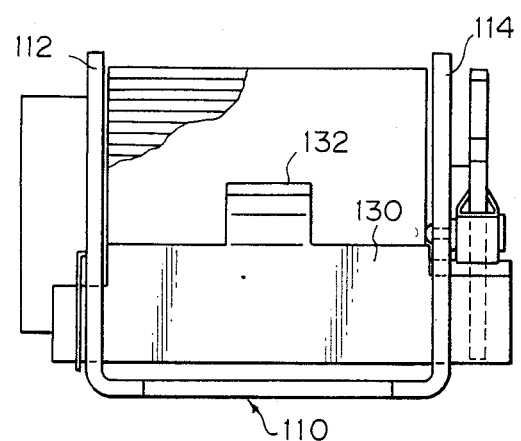

When the draw-out force of the webbing 16 acts in this state, the latch plate 20 and gear 24 turn counterclockwise and, as shown in FIG. 7, the pawl portion 48 comes into complete (deep) engagement with the engaging hole 22 and the lever 40 is further turned clockwise, and the pawl 36 comes into engagement with the latch portion 18 to block counterclockwise turning of the latch plate 20, i.e., any further draw-out of the webbing 16. At this time, the plate spring 50 and stopper 60 turns clockwise. Of course, at this time, the take-up radius sensing member 30 does not hamper the operation of the pawl 36.

Description will now be made of a case where the webbing 16 is taken up. When the coupling between the tang and the buckle is released, the take-up spool, the latch plate 20 and the gear 24 are turned clockwise by the action of the take-up spring and the webbing 16 is taken up onto the spool. At this time, due to the contact between the pawl portion 48 and the gear 24 (both of which are made of resin), the pawl 36 and the latch plate 20 come into contact with each other, whereby production of abnormal noise is prevented. Also, the leaf spring 50 and stopper 60 are in their counterclockwisely turned state (see FIG. 6).

When the webbing 16 is taken up onto the take-up spool to a certain degree, the winding layer of the webbing 16 comes into contact with the tongue-like portion 32, whereafter the lever 40 is turned counterclockwise by the take-up radius sensing member 30. When the webbing 16 is completely taken up, the lever 40 assumes its counterclockwisely turned state (see FIG. 2) by the action of the take-up radius sensing member 30. When the webbing 16 is again drawn out, the leaf spring 50 and stopper 60 turn clockwise and assume the position shown in FIG. 2.

Thus, in the present embodiment, the leaf spring 50 and stopper 60 are disposed in the space of one corner (the left upper corner as viewed in FIG. 2) of the side plate 14 and therefore, the widthwise dimension of the entire apparatus is not increased. That is, this space has originally been useless and, even if the leaf spring 50 and stopper 60 are disposed therein, the amount of sidewise protrusion thereof does not exceed the amount of protrusion of the latch plate 20 and lever 40.

A second embodiment of the present invention will now be described with reference to FIGS. 8–12.

Figure 10:
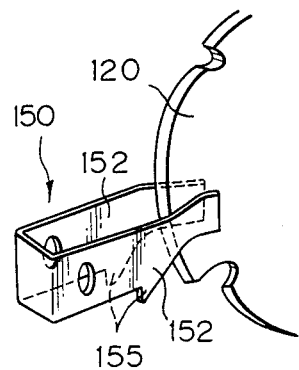
FIGS. 8 to 12 show a second embodiment of the present invention, in which FIG. 8 being a front view, FIG. 9 being a side view, FIG. 10 being a perspective view of a leaf spring 150, and FIGS. 11 and 12 being side views for illustrating the operation.

A take-up radius sensing member 130 having a tongue-like portion 132 is rockably extended between the opposite side plates 112 and 114 of a base 110, and one end portion 136 thereof provides a pawl (lock means) engageable with the latch portion 118 of a latch plate 120. Above the pawl 136, a leaf spring 150 (control means) of V-shaped cross-section is mounted for pivotal movement about a pin 170, and as shown in FIG. 10, a pair of planar portions 152 resiliently hold the peripheral edge portion of the latch plate 120 therebetween. A projection 155 engaged with the pawl 136 is formed on the lower edge of each of the planar portions 152.

Figure 9:
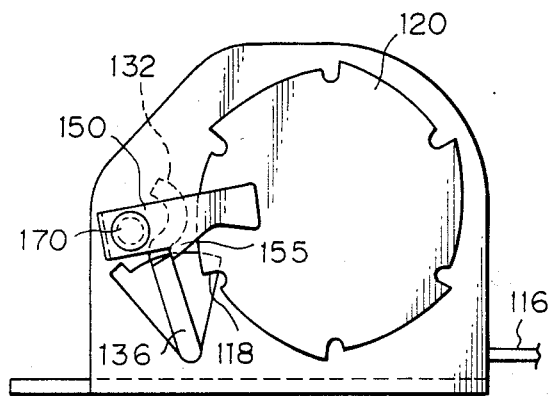

The operation of the present embodiment is as follows. In the initial stage of draw-out of webbing 116, as shown in FIG. 9, the leaf spring 150 turns clockwise as the latch plate 120 turns counterclockwise, and the projection 155 thereof is in engagement with the tip end of the pawl 136. Accordingly, as the webbing 116 is drawn out and the take-up radius thereof becomes smaller, the contact between the tongue-like portion 132 and the winding layer is released, but the pawl 136 is not turned clockwise from its position shown in FIG. 9.

When the webbing 116 is slightly slackened after it has been drawn out by a predetermined length and the tang and the buckle have been coupled together, the latch plate 120 is turned clockwise by the action of a take-up spring and correspondingly the leaf spring 150 turns counterclockwise, whereby the engagement between the projection 155 and the pawl 136 is released. Therefore, as shown in FIG. 11, the pawl 136 is turned clockwise by the action of a spring and comes into contact with the peripheral edge portion of the latch plate 120.

Figure 12:
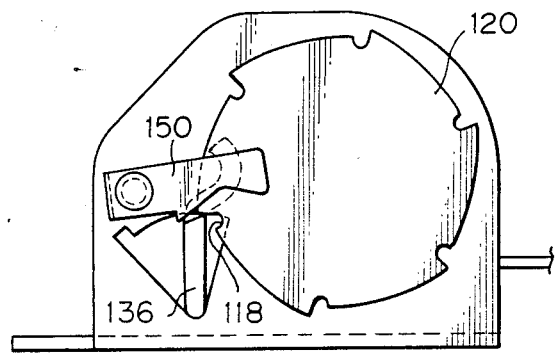

When the webbing 116 is slightly drawn out in this state, as shown in FIG. 12, the latch plate 120 turns clockwise and the pawl 136 comes into engagement with the latch portion 118 to block any further draw-out of the webbing 116.

Figure 11:
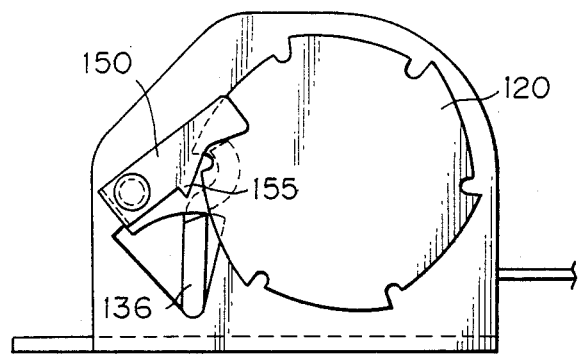

During the take-up of the webbing 116, when the coupling between the tang and the buckle is released, the latch plate 120 is turned clockwise by the action of the take-up spring and correspondingly the leaf spring 150 turns counterclockwise and therefore, the engagement between the projection 155 and the pawl 136 is released (see FIG. 11). When the webbing 116 is slightly drawn out after it has been completely taken up, the latch plate 120 turns counterclockwise and the leaf spring 150 turns clockwise and assumes its position shown in FIG. 9. The operation of the take-up radius sensing member 130 basically does not differ from that of the aforedescribed take-up radius sensing member 30. Also, the range of pivotal movement of the leaf spring 150 is controlled by a pair of stoppers, not shown (see the aforementioned stoppers 72 and 74).

In the present embodiment, the leaf spring 50 and stopper 60 in the first embodiment are made integrally with each other to form the leaf spring 150 and therefore, in addition to the effect of the first embodiment, the number of parts is reduced, the assembly becomes easier and the cost of manufacture is reduced.

The present invention is not restricted to the above-described embodiments, but suitable changes and improvements therein are of course possible without departing from the scope of the invention. For example, the gear 24 in the first embodiment is effective in preventing the pawl 36 and the latch plate 20 from coming into contact with each other during the take-up of the webbing 16 to produce abnormal noise, but it is not functionally indispensable. Also, the details of the lever 40, the leaf spring 50, the stopper 60, etc. can of course be changed as required.

I claim:

1. An automatic locking type take-up apparatus including a base, take-up means rotatably supported by said base and biased in a webbing take-up direction, a latch plate rotatable with said take-up means, lock means capable of assuming a locking position in which it is engaged with the latch portion of said latch late to block draw-out of webbing and a non-locking position in which it is out of engagement with said latch portion to permit draw-out of the webbing and biased toward said locking position, and control means mounted radially outwardly of the latch plate on said base and resiliently contacting said latch plate and interlocking therewith and engageable with said lock means, said control means keeping said lock means in said non-locking position when it assumes a first position during the draw-out of the webbing and permitting the movement of said lock means to said locking position when it assumes a second position when some rewinding of the webbing after the draw-out thereof has been sensed.

2. An automatic locking type take-up apparatus according to Claim 1, wherein said control means includes a pivotable member pivotable about an axis parallel to the rotary shaft of said take-up means, said pivotable member being provided with a first member having a pair of gripping portions for resiliently gripping the peripheral edge of said latch plate from the opposite sides thereof, and an engaging portion made integral with said first member and engageable with said lock means.

3. An automatic locking type take-up apparatus according to claim 1, wherein said control means includes a pivotable member pivotable about an axis parallel to the rotary shaft of said take-up means, said pivotable member being provided with a pair of gripping portions for resiliently gripping the peripheral edge of said latch plate from the opposite sides thereof, and engaging portions formed on each of said gripping portions and engageable with said lock means.

* * * * *